July 26, 1955  A. J. AZBILL  2,714,181
STATIC ELECTRICITY ELIMINATOR FOR MOTOR VEHICLE SEATS
Filed July 14, 1952
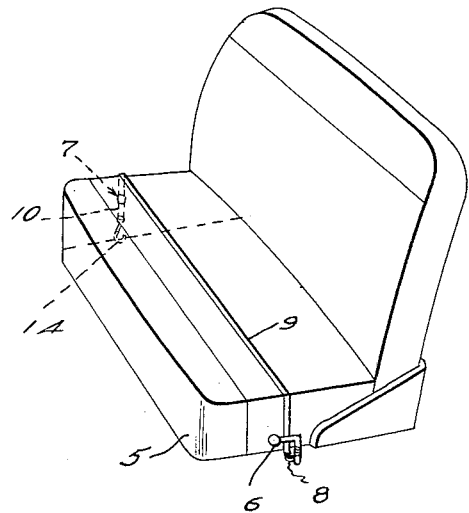
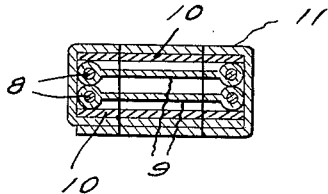
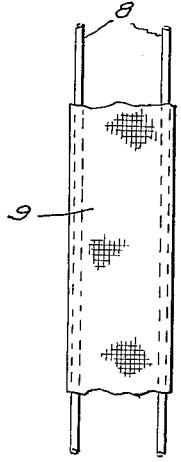
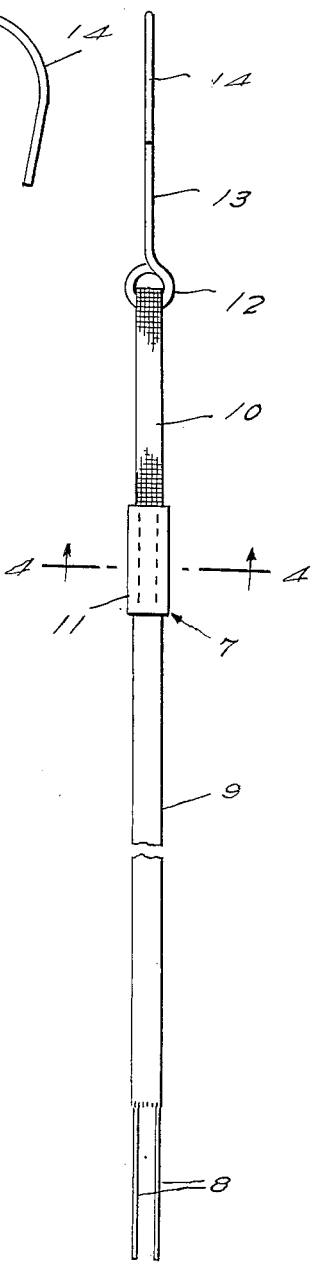
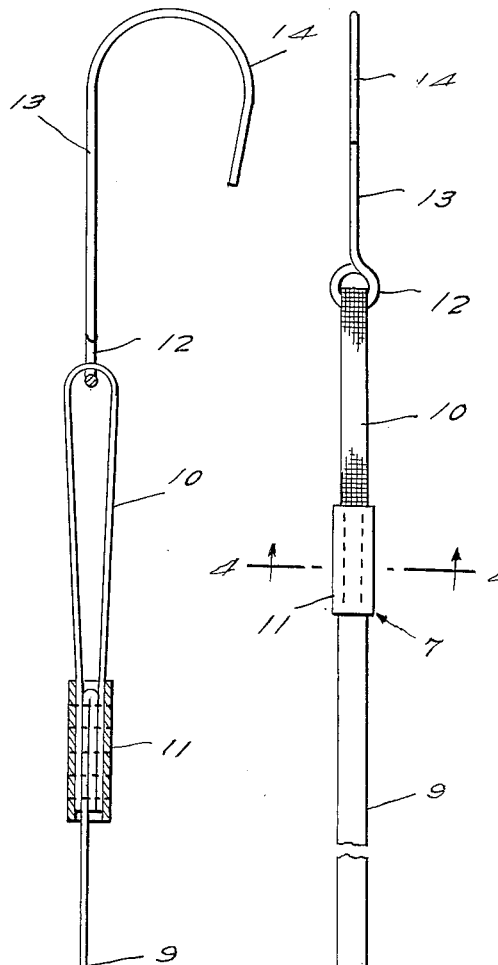
Inventor
Andrew J. Azbill
By Bernard F. Harvey
ATTY

United States Patent Office 2,714,181
Patented July 26, 1955

2,714,181

STATIC ELECTRICITY ELIMINATOR FOR MOTOR VEHICLE SEATS

Andrew J. Azbill, Reno, Nev., assignor to Shok-Pruf Manufacturers and Distributing Company, a corporation of Nevada Application July 14, 1952, Serial No. 298,815

2 Claims. (Cl. 317—2)

This invention consists of a static electricity eliminator for motor vehicle seats and has for an object to provide a simple attachment which may be quickly engaged over top of a seat cover made of plastic, nylon and fibres or like materials which at times generate static electricity when the hand of a passenger comes in contact with a metal part of the vehicle.

Efforts have been made over the years to eliminate static electricity from motor vehicles which often occurs when a passenger in the vehicle turns the ignition key, opens the door or performs like operations, resulting in shock to the passenger. As shown in the patent to Hunt, No. 1,744,004, it was attempted to accomplish the desideratum of this invention by incorporating the intended static eliminator in the seat. All these efforts or attempts have, as far as is known, failed and it was only after much experiment and use of the device, made in accordance with the teaching of this invention, on hundreds of automobiles that the operativeness and practicability of this invention was definitely established. My invention is capable of use on any make automobile and any kind of seat and I have found that best results are obtained by stretching the attachment lengthwise of the seat in superimposed relation to the seat cover and including conductor wires grounded at one end to a metal part of the vehicle, the opposite end of the attachment being anchored to the opposite end of the seat.

Other objects of the invention will be apparent from the following description of the presently preferred form of the invention, wherein:

Fig. 1 is a perspective view of an attachment constructed in accordance with the invention illustrating its application;

Fig. 2 is a plan view of the attachment;

Fig. 3 is an edge elevational view thereof;

Fig. 4 is a cross sectional view taken on the line 4—4 of Fig. 2 showing the manner of connecting the sleeve or clip to the elastic band and to the covering encased wires, and Fig. 5 is a fragmentary plan view of the fiber covering and wires.

In order to illustrate the application of this invention I have shown a vehicle seat 5 equipped with an adjusting handle 6 of conventional design.

The device of my invention consists of an attachment generally designated 7 which comprises one or more conductor wires 8 encased, except at one end, in a fiber covering 9. The wires at one end are exposed and wrapped around a conductor on the seat or the vehicle adjacent one end of the seat. In Fig. 1 of the drawings the free ends of the wires 8 are shown engaged with the seat adjusting handle 6 in order to illustrate the application of the invention. The opposite end of the attachment 7 is mounted between the free ends of an elastic band 10, said free ends of the band and the end of the attachment 7 being encased in and fixedly secured to a sleeve or binding clip 11. The band 10 is trained through an eye 12 on one end of a hook 13, the bill 14 of the hook being engaged with one end of the seat 5 as shown in Fig. 1. The elastic band 10 in addition to holding the attachment taut on the seat, also insulates the hook from the wires 8 of the attachment.

The attachment 7 is relatively narrow and, as shown in Fig. 1, is adapted to be engaged with the seat lengthwise of the latter with the hook 13 engaged with one end of the seat and the opposite end of the attachment engaged to or near the opposite end of the seat. By providing the elastic insert 10 the attachment is held taut at all times while in engagement in superimposed relation to the seat cover, as shown in the drawing. As is apparent the attachment is adapted for facile engagement with and disengagement from the seat.

Various changes may be made within the scope of the appended claims.

What I claim is:

1. A static electricity eliminator for motor vehicle seats including an electric conductor attachment detachably engaged with the seat lengthwise of the latter, the attachment comprising a hook engaged with one end of the seat, wires grounded at the opposite end of the seat together with an elastic insert between the hook and wires to hold the attachment taut when in use.

2. A static electricity eliminator for motor vehicle seats including an electric conductor attachment for the vehicle seats, one end of the attachment being engageable with one end of the seat, an elastic band, the opposite end of the attachment being mounted between the free ends of said elastic band, a binding clip encasing and fixedly securing the free ends of the band and the end of the attachment, and a hook secured to said band, the bill of said hook being engaged with the other end of the seat.

References Cited in the file of this patent

UNITED STATES PATENTS

| | | |
|---|---|---|
| 1,243,654 | Clark | Oct. 16, 1917 |
| 1,419,261 | Howard | June 13, 1922 |
| 1,744,004 | Hunt | Jan. 14, 1930 |
| 1,940,491 | Freitag | Dec. 19, 1933 |
| 2,302,003 | Cadwell | Nov. 17, 1942 |
| 2,416,202 | Naumann | Feb. 18, 1947 |